March 22, 1932.  E. A. SPERRY  1,850,978
RECORDER FOR SHIPS
Filed March 29, 1922   7 Sheets-Sheet 1

Inventor
ELMER A. SPERRY.
By his Attorney
Herbert H. Thompson

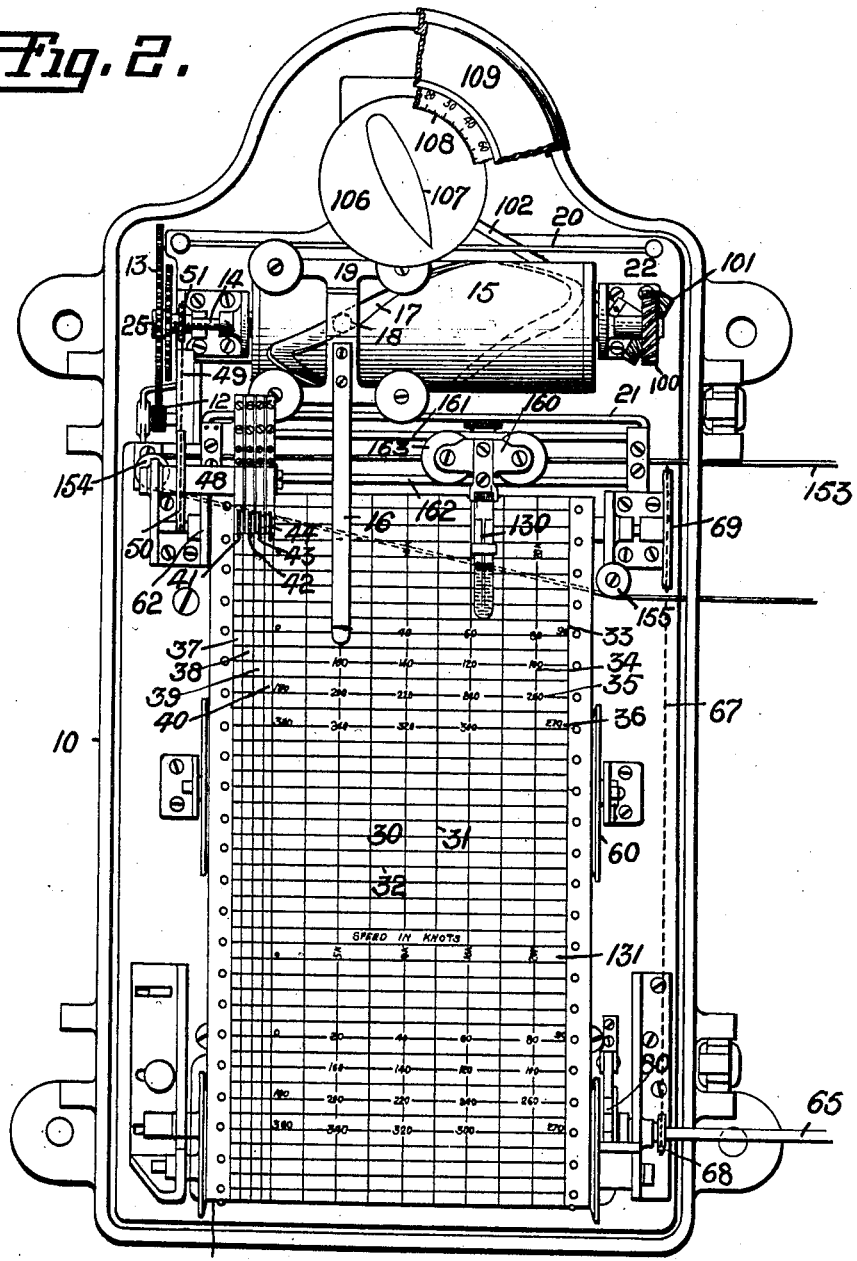

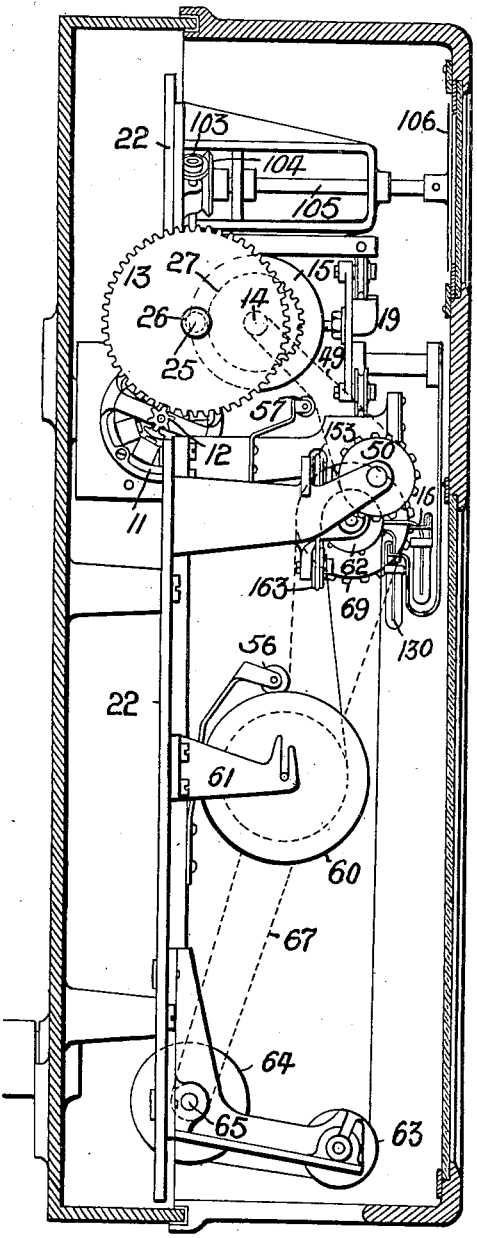
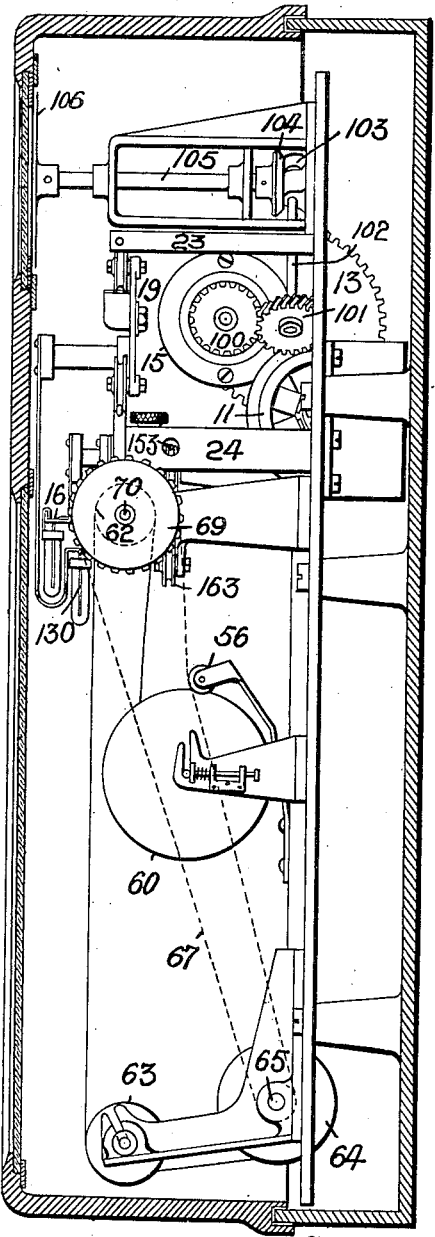

March 22, 1932.  E. A. SPERRY  1,850,978
RECORDER FOR SHIPS
Filed March 29, 1922   7 Sheets-Sheet 4
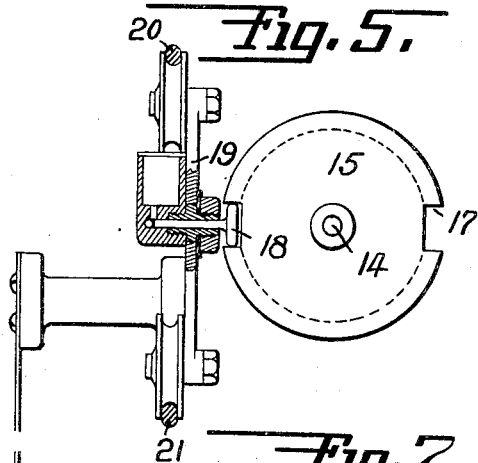
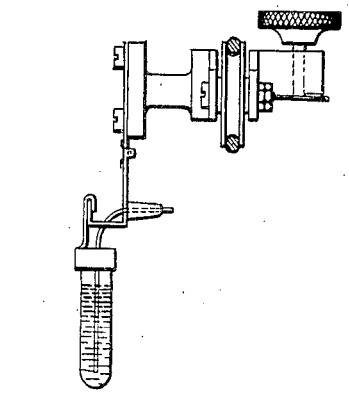
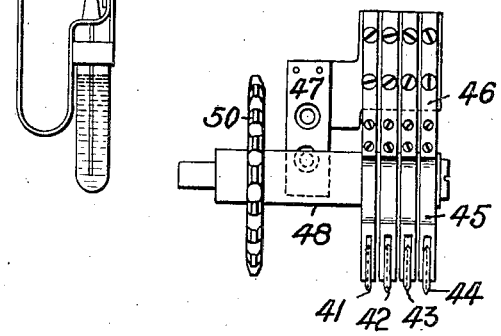
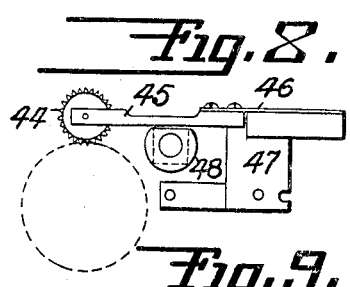
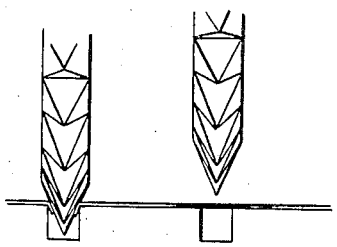
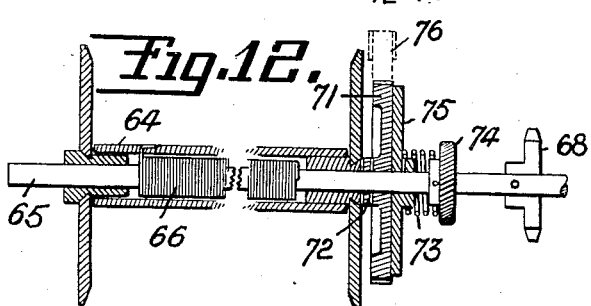
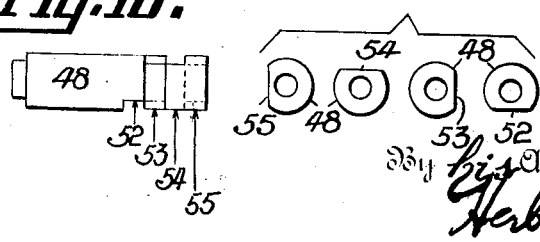
Inventor
ELMER A. SPERRY.
By his Attorney
Herbert H. Thompson March 22, 1932. E. A. SPERRY 1,850,978
RECORDER FOR SHIPS
Filed March 29, 1922 7 Sheets-Sheet 5
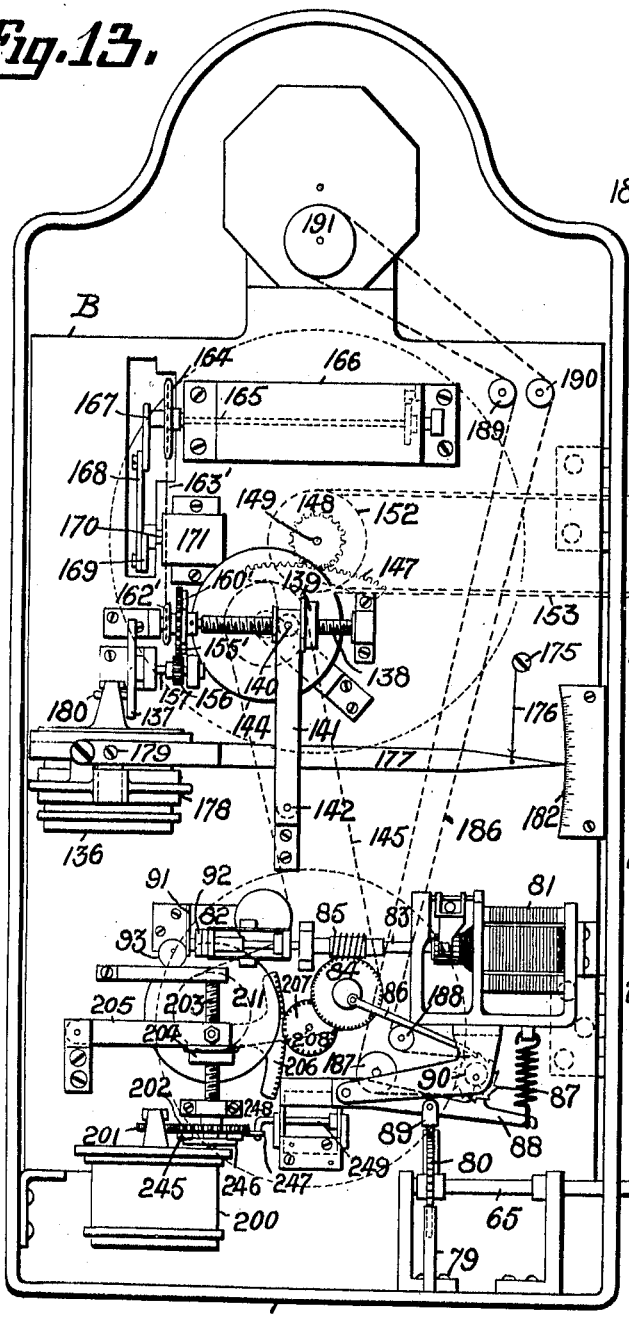
Inventor
ELMER A. SPERRY.
By his Attorney
Herbert H. Thompson March 22, 1932.                E. A. SPERRY                1,850,978
                             RECORDER FOR SHIPS
                      Filed March 29, 1922      7 Sheets-Sheet 6
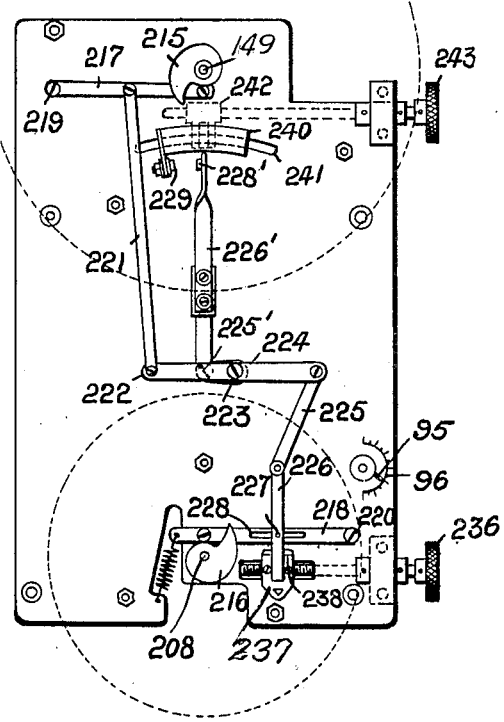
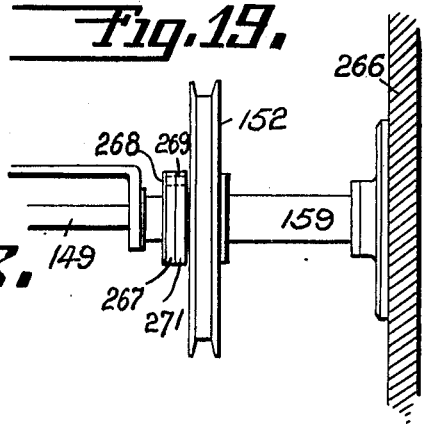
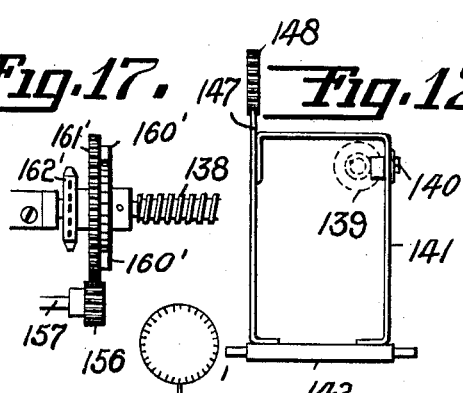
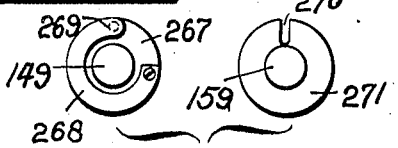
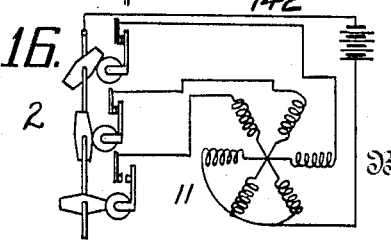
Inventor
ELMER A. SPERRY.
By his Attorney
Herbert H. Thompson

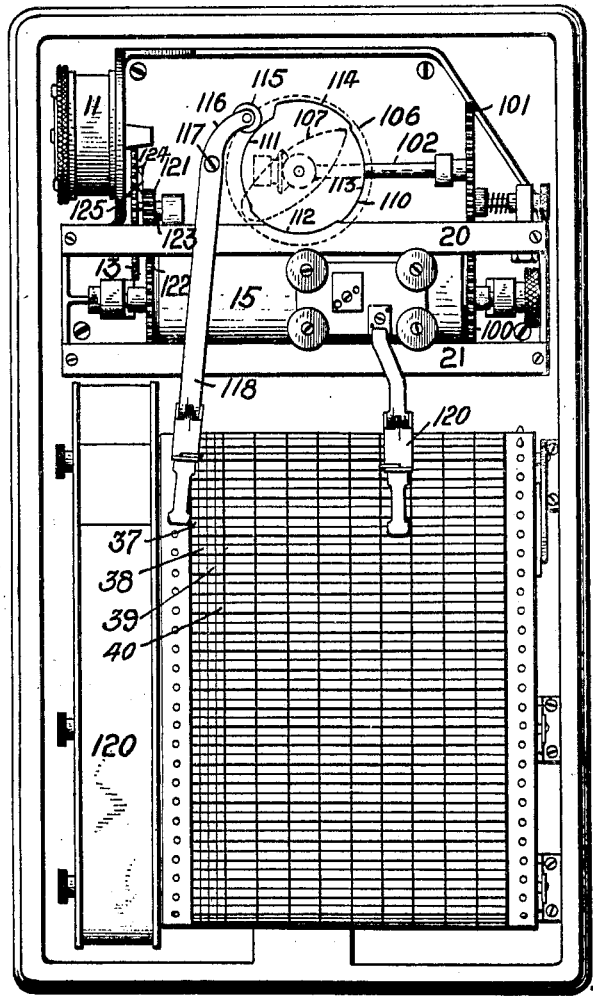
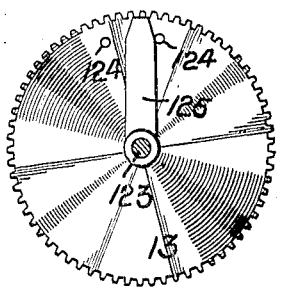
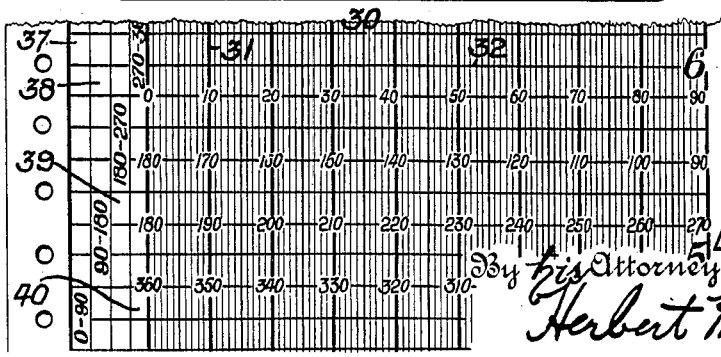

Patented Mar. 22, 1932

1,850,978

UNITED STATES PATENT OFFICE

ELMER A. SPERRY, OF BROOKLYN, NEW YORK, ASSIGNOR, BY MESNE ASSIGNMENTS, TO SPERRY GYROSCOPE COMPANY, INC., A CORPORATION OF NEW YORK

RECORDER FOR SHIPS

Application filed March 29, 1922. Serial No. 547,599.

This invention relates to indicating and recording means and has for one of its objects the provision of improved indicating and recording means whereby a plurality of indications and records responsive to various factors may be obtained. More particularly, this invention has for its object the provision of an indicating and recording instrument for a ship, which is adapted to indicate and record factors such as the course or heading of the vessel, the speed, the total distance traveled, the presence of shoal water, etc.

A further object of this invention is the provision of a novel, compact, easily-readable recording chart upon which a plurality of records indicating various factors may be traced within comparatively narrow limits.

Other objects and advantages will hereinafter appear.

In the accompanying drawings;

Fig. 2 is a front elevation, with the front cover removed, of the portion of the instrument which includes the recording means.

Fig. 3 is a side view of the device shown in Fig. 2, the casing having been sectioned vertically to disclose the mechanism therein.

Fig. 4 is a view similar to Fig. 3, but taken from the opposite side of the device.

Fig. 5 is a side view, partly sectioned, of the pen for recording deviations from the course, and of the means controlling said pen.

Fig. 6 is a side view of the speed-recording pen and the controlling means therefor.

Fig. 7 is an enlarged detail of the quadrant recording means.

Fig. 8 is a side view of the quadrant recording means.

Fig. 9 is an enlarged detail of the recording members of the quadrant recording means.

Fig. 10 is a front view of the shaft controlling the recording members of Fig. 9.

Fig. 11 is a series of diagrammatic sections of the shaft shown in Fig. 10.

Fig. 12 is a front view, vertically sectioned, of the winding-drum for the recording chart.

Fig. 13 is a back view of the indicator, the back cover having been removed.

Fig. 14 is a side elevation of the device shown in Fig. 13 removed from its casing.

Fig. 15 is a front elevation of a shoal water indicator forming part of the device shown in Figs. 13 and 14.

Fig. 16 is a view, largely diagrammatic, showing a gyroscopic compass and a repeater compass in circuit therewith.

Fig. 17 is an enlarged detail of a portion of the driving means for the distance registering mechanism.

Figure 1:
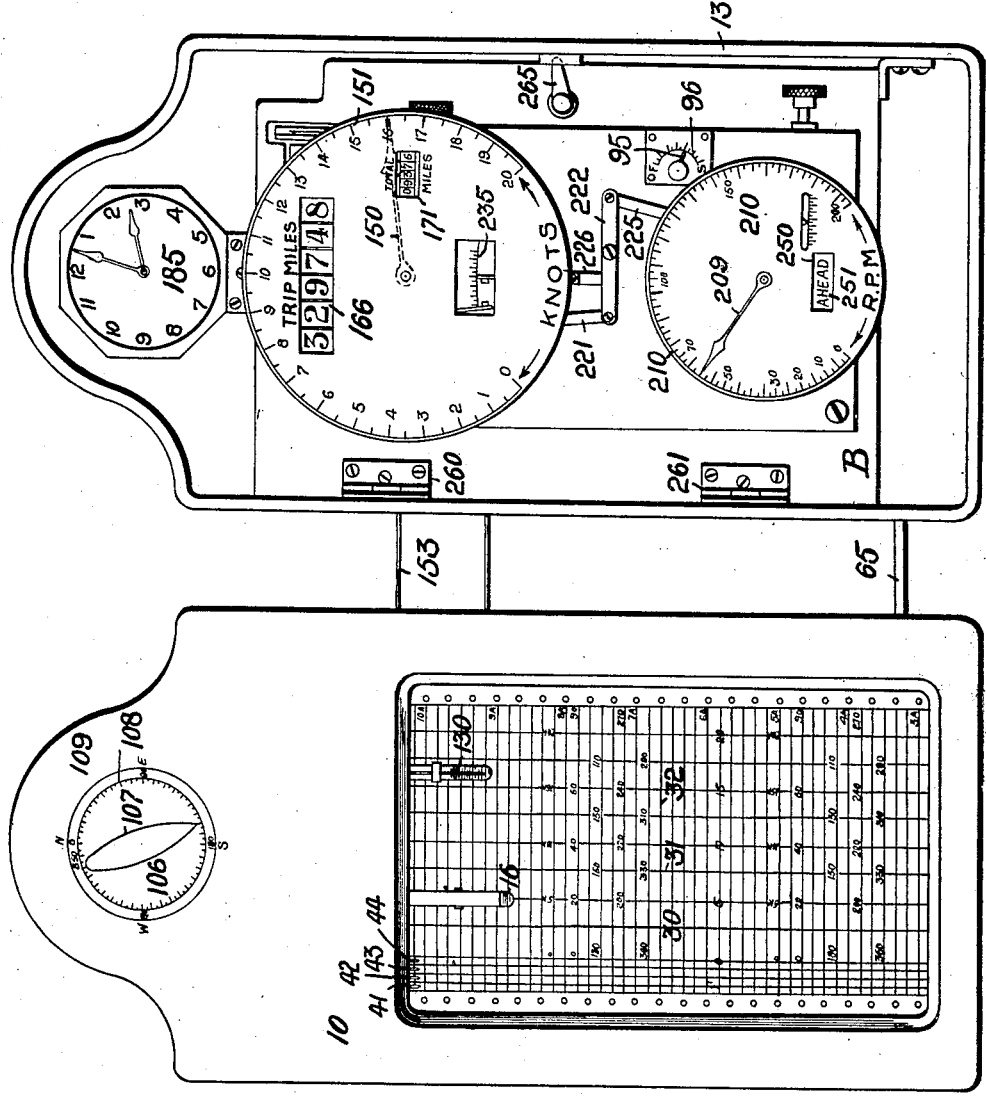
Fig. 1 is a front elevation of the indicating and recording instrument forming the subject of my invention.

Fig. 18 is an enlarged detail of a portion of the speed indicating mechanism and of the R. P. M. indicator.

Fig. 19 shows the connection between the swingable cover of the casing and the mechanism contained therein.

Fig. 20 is a view of two members forming part of the connection shown in Fig. 19.

Fig. 21 is a view similar to Fig. 2 showing a modified form of my invention, including a modified form of quadrant-indicating mechanism.

Fig. 22 is a detail showing a lost-motion mechanism for preventing recording of vibrations not due to actual change of course.

Fig. 23 is an enlarged view of a portion of the recording chart shown in Fig. 21.

Referring to the drawings there is shown in Fig. 1 a recording instrument 10 for giving a graphic representation of circular motion of a moving object. The invention is illustrated in connection with the circular movements of a ship in order to record its course for any desired period of time, but the invention is not limited to such use. The ship's course is indicated by a compass, preferably a gyroscopic compass 1 (Fig. 16), which is connected through a transmitter 2 to control a step by step repeater motor 11 (Fig. 4) (as shown in the patent to Sperry, No. 1,296,440 granted March 4, 1919). A pinion 12 (Fig. 2) fixed to the shaft of said motor meshes with a gear 13 fixed to a shaft 25 upon which is fixed a pinion 26 (Fig. 3) meshing with a gear 27 fixed to the shaft 14 of a roller 15, so that any movements of the compass will be transmitted to the roller 15.

The rotary movements of the roller are translated into horizontal movements of a stylus or pen 16 by means of a cam slot 17 in which operates a pin or roller 18 journaled in a carriage 19 to which the pen 16 is also fixed, said carriage operating against upper and lower rails 20 and 21, respectively, fixedly attached to the rear board 22 by brackets 23 and 24. The carriage 19 being thus held against vertical movement, the rotary movements of the roller 15 will cause horizontal movements of the carriage and pen 16.

The pen contacts with a chart 30 which is fed downwardly as a flat sheet so that the pen traces a line thereon. If the ship maintains a steady course, the line traced will be vertical, but should the vessel change its course or deviate therefrom in any manner, the line traced will be inclined to the vertical, the degree of inclination being dependent upon the amount of deviation or change of course. The cam slot in the roller 15 is so positioned relative to the chart that when the ship is heading directly north, the pen 16 will coincide with the "0" line on the chart. The chart is subdivided by vertical lines 31 to indicate degrees of latitude and by horizontal lines 32 to indicate intervals of time. Ordinarily the chart would be ruled so that one complete revolution of roller 15, corresponding to one complete circle of the compass, would operate the pen from one side of the chart to the other, necessitating subdivision of the chart to indicate 360°. As a consequence, the chart would either have to be very wide, necessitating a large instrument, or else the distance between degrees would be so small as to make small deviations in course difficult to read. This invention, therefore, divides the width of the chart into a fraction of 360° say 90° and provides that the pen travel across the chart from one side thereof to the other four times for every complete revolution of roller 15.

For this purpose the cam slot 17 and the roller 15 extends across the roller and back again for a complete 360° turn of the roller, and in addition the roller is rotated completely around twice for each turn of the ship, this being accomplished by suitable gear ratios between the repeater motor 11 and the roller through the reduction gearing 12—13. It will be apparent therefore, that when the ship deviates from true north, the pen 16 will move from left to right until the deviation reaches 90° in azimuth; beyond 90° and up to 180° the pen will be carried back from right to left; between 180° and 270° the pen will travel from left to right, and between 270° and 360° the pen will travel from right to left.

At any given time, therefore, the pen may indicate any of four positions, depending upon the quadrant of the azimuth scale in which the compass is indicating. Thus in Fig. 2, pen 16 may indicate 20°, 160°, 200°, and 340°. To indicate the quadrant and hence, which of the four lines of indicia, 33, 34, 35, 36, is to be read, the chart is provided adjacent one edge with four vertical subdivisions 37, 38, 39 and 40 indicating the first, second, third, and fourth quadrants, respectively. Each of said subdivisions is provided with its marker 41, 42, 43, 44, which in the present instance is a perforator, normally held out of contact with the chart, but which is pressed into the chart to perforate in the proper subdivision when the compass is operating in the respective quadrant. For this purpose, the perforators are in the form of star wheels journaled in one end of supporting arms 45 (Fig. 7), the other ends of which are fixed to leaf springs 46 fixed to a bracket 47 (see Fig. 8). The springs 46 normally press the markers into engagement with the chart, but such engagement is prevented by a cam shaft 48 extending beneath the arms 45 and pressing them away from the chart. Said shaft is connected to shaft 14 by a chain 49 and sprockets 50 and 51 fixed to the shafts 48 and 14 respectively, so that the rotary movement of roller 15 is transmitted to shaft 48. The chain gearing is such that one complete revolution of roller 15 is equivalent to one revolution of shaft 48. The latter is provided with cut-out portions (Fig. 10), one beneath each arm 45, said cut-out portions being positioned 90° apart. While the compass moves in the first quadrant, the cut-out portion 52 is beneath the arm supporting marker 41 and hence the latter is being pressed by spring 46 into engagement with the chart, and as the latter moves downwardly, a series of perforations in column 37 will indicate to the observer that the first quadrant figures 33 are to be read. As the compass moves to indicate in the second quadrant, shaft 48 is rotated to raise cam marker 41 out of engagement with the chart and allow marker 42 to drop into cut-out portion 53 to engage and perforate the chart in the second column 38 to indicate that figures 34 are to be read. Similarly, marker 43 operates when in cut-out portion 54 to perforate in column 39 to indicate that figures 35 are to be read, and marker 44 operates when in cut-out portion 55 to indicate that figures 36 are to be read. The rows of figures 33, 34, 35, 36 are, of course, repeated at short intervals throughout the length of the chart.

It will thus be obvious that the chart is subdivided into sections, one of which serves as the indicator of the other, i. e., the section comprising subdivisions 37, 38, etc. indicate the sectors of the circle in which the compass is operating, while the remaining portion of the chart indicates the subdivisions of such sector.

The chart may be fed in any suitable manner, but is preferably carried upon a roller 60 (Figs. 3 and 4) mounted in brackets 61 fixed to the rear board 22, the free end of the chart-roll being carried upwardly over a roller 62, thence downwardly in front around a front guide roller 63 and to a rewind roller 64. The latter is connected to a shaft 65 by a spring 66 (Fig. 12) connected at one end to the roller and at the other end to the shaft, said roller being rotated relatively to said shaft to place the spring under such tension that further rotation of the shaft will rotate the roller, instead of merely further winding up the spring. The roller 64 is prevented from rotating in a direction to relieve the tension of the spring by a pawl 76 engaging a ratchet-wheel 71 loosely mounted on shaft 65 and having frictional engagement with the roller through a collar 72 also loosely mounted on said shaft; the frictional pressure is obtained through a spring 73 fixed at one end to a nut 74 adjustably secured to the shaft 65 and at its other end engaging a plate 75 splined upon the shaft so that it may be pressed into engagement with the ratchet-wheel 71. The shaft 65 is prevented from rotating in a direction to relieve the tension of the spring by a pawl 79 (see Fig. 14) engaging a ratchet-wheel 80 fixed to the shaft 65. Means to be hereinafter more fully described are provided for rotating shaft 65 at regular intervals through equal distances in a direction to further wind the spring 66, but if the initial tension placed upon the spring as described above is sufficient, the rotation of the shaft will be transmitted to roller 64 to wind up the chart. As the shaft 65 is rotated, the chart is unwound from roller 60 by means of a chain 67 connecting a sprocket-wheel 68 on shaft 65 to a sprocket-wheel 69 on shaft 70 (upon which upper roller 62 is fixed), so that with each actuation of shaft 65 a uniform strip of chart will be unwound. As the chart is rewound upon roller 64, the circumference of the wound roller constantly increases, so that each actuation of shaft 65 will cause a constantly increasing peripheral movement of the roller 64, so that there would be a tendency for constantly increasing strips of chart to be wound upon roller 64. Since the amount of chart unwound from roller 60 at each actuation of shaft 65 is constant it is necessary to provide a certain amount of slip between shaft 65 and roller 64 to allow for the increasing peripheral movement of the latter, this connection comprising the friction members 71, 72 and 75, the spring 73 and the nut 74. Suitable spring-pressed detents 56 and 57 may be provided to take up any slack in the chains 67 and 49 respectively.

The upper and lower rollers may be provided with sprockets engaging in perforations in the edges of the chart to facilitate feeding.

For actuating shaft 65 through equal angular distances at regular intervals, any suitable driving mechanism may be employed, but in the present case there is provided a motor 81 (Fig. 13) which is maintained at constant speed by a governor 82 which may be regulated by a make and break system of contacts 91 and 92, the air space between said contacts being controlled by an eccentric 93 engaging one of said contacts. An index hand 95 (Fig. 15) movable integrally with eccentric 93 may cooperate with a scale 96 whereby the operator may set the governor at any predetermined point. The rotation of the motor shaft 83 is transmitted to a gear 84 through a worm 85 on said shaft. A crank arm 86 is mounted eccentrically with respect to gear 84 so that once in each revolution of gear 84, said crank arm operates a ratchet-wheel 87. A cam 90 fixed to said ratchet-wheel 87 actuates once in each revolution of said wheel a link 88, to cause a link 89 pivotally connected to link 88 to reciprocate, so that link 89 engages the ratchet-wheel 80 to rotate the latter through one tooth-space, and hence, rotate shaft 65. It will be obvious that the rapid rotation of the motor is stepped down successively by the connection between worm gear 85 and gear wheel 84, the connection between gear 84, crank 86, and ratchet-wheel 87, and the connection between ratchet-wheel 87, cam 90 and links 88 and 89, so that extremely slow movement of shaft 65 may be obtained from the rapidly rotating motor shaft 83.

From the above description it will be apparent that the chart is fed downwardly at a uniform rate and that the pen 16 traces a line corresponding to the course of the vessel. It is also apparent that by subdividing the entire width of the chart to indicate 90° instead of 360° as usual, there is obtained a much more easily readable chart of great sensitiveness, even slight variations being readily apparent. The subdivisions of the chart to indicate 90° is made possible by the auxiliary quadrant indicating means which shows clearly upon the chart in which quadrant of the azimuth scale the compass is indicating.

While the chart has been subdivided laterally to represent one-fourth of a complete revolution of the compass, it will be apparent from the description that the chart may be subdivided laterally to represent any other desired fraction of a revolution, corresponding changes being made so as to operate the pen back and forth for each revolution of the compass a number of times corresponding to the number of said fractions in one revolution of the compass. In this case there would be provided also, a corresponding number of markers such as 41 and a similar number of subdivisions such as 37.

While pen 16 traces a permanent record of the ship's course, there may be provided also an indicator which will show at a glance the course being followed by the ship. For this purpose the shaft 14, upon which roller 15 is mounted, may be provided with a gear 100 meshing with a gear 101 on a shaft 102 (see Fig. 4) which carries a bevel pinion 103 meshing with a bevel gear 104 which has twice the number of teeth as pinion 103 so that the shaft 105 thereof which carries indicator 106 at the front of the instrument rotates at one half speed of the cam 15 and, therefore, rotates one revolution for one complete turn of the ship. The latter may be provided with any suitable index such as a boat outline 107. An azimuth scale 108 is fixedly mounted on the front of the recorder casing 10 to cooperate with the index 107. The indicator 106 is so geared to roller 15 that index 107 will indicate zero on scale 108 when pen 16 indicates zero on chart 30, corresponding to due N. indication of the compass, and so that one complete revolution of roller 15 will cause rotation of indicator 106 and index 107 through 360°. The index 107 will thus give a visual representation of the ship with respect to its course in azimuth and also furnish a means (other than that given by the record on columns 37 to 40 of the chart) for showing which quadrant the pen 16 is operating in.

In Figs. 21 and 22 there is illustrated a modification in which the indicator 106 is utilized to control the quadrant-indicating means. Since, as pointed out above, the indicator 106 makes a complete revolution corresponding to a movement of the compass in azimuth of 360°, the periphery of the indicator, or in this case, a plate 110 at the rear of and parallel to said indicator, may be provided with four cam surfaces 111, 112, 113, 114 projecting outwardly to a successively greater degree. Contacting with the periphery of the plate 110 is a roller 115 carried at one end of an arm 116 of a bell-crank pivoted at 117, so that as the indicator 106 and plate 110 rotate, the roller 115 will occupy various positions according to which of the cam surfaces it rests upon. Thus, in Fig. 21 the roller 115 contacts with the cam surface 111, and arm 118 of the bell-crank is held so that the pen at the end thereof indicates in the first vertical column 37 of the chart, indicating that the first quadrant figures are to be read in connection with the recording of pen 120. As roller 115 rises upon cam surface 112, due to the rotation of the compass and of the indicator to more than 90°, arm 118 is swung so that it indicates in the second column, indicating the second quadrant. Similarly, when the roller rides upon cams 113 and 114, the arm 118 will indicate in the third and fourth columns 39 and 40, respectively, indicating the third and fourth quadrants. It will be understood that the cam surfaces move the pen arm 118 from one quadrant to another across the division lines between the same as the principal pen 120 reaches one edge of the chart and reverses. There being four quadrants separated by three division lines in the narrow portion of the chart, the middle division line, i. e., the line separating quadrant 38 and quadrant 39 (Fig. 23) divides the narrow portion of the chart into two halves and is, therefore, a center line separating the zero-180° sections from the 180°-360° sections. In Fig. 23 are shown the four rows of graduations, each totaling 90°, and corresponding to the four quadrants as indicated in the four vertical rows, 37, 38, 39 and 40.

In the modification shown in Fig. 21 the chart is driven by a suitable clockwork mechanism 120. To provide against recording the "hunt" i. e., the constant vibratory motion to which a gyroscopic compass is continuously subjected, there is provided a lost-motion connection between the repeater motor 11 and the gearing 121, 122, which drives the roller 15. For this purpose gear 13 driven by the motor 11 is loosely mounted on shaft 123 and is provided with spaced pins 124 (Fig. 22) between which operates an arm 125 fixed to the shaft 123. It will thus be apparent that the slight vibratory movements of the compass will cause gear 13 to vibrate without affecting arm 125 and, hence, without operating roller 15 or pen 120. Movements of the compass in excess of the amount of these small vibratory movements will cause one of the pins 124 to contact with arm 125 and rotate roller 15.

For the purpose of plotting the ship's course, it is highly desirable to know not only the course but the speed as well at any given time. For this purpose, there is provided an additional stylus or pen 130 (Figs. 2-4) operable by any suitable speed-responsive mechanism and cooperating with speed indicia 131 repeated at intervals throughout the length of the chart. The indicia 131 may indicate knots or kilometers per hour. In the present case the speed-responsive mechanism is contained within a second casing 135 (Fig. 1) positioned adjacent the recorder casing 10, and in casing 135 may be positioned also the driving mechanism for the shaft 65 hereinbefore described. For driving this mechanism I have shown a repeater motor 136 designed to be actuated from a transmitter (not shown) driven by any form of speed responsive device, such as a ship's log or the propeller shaft or shafts. Said motor 136 drives a disc 137 through friction gearing 180. Disc 137, through suitable gearing, rotates a screw 138 along the length of which operates an internally-threaded collar 139, said collar having an external circumferential groove in which operates a pin 140 carried by a yoke 141 pivotally mounted in a bracket 142. The collar 139 is in frictional engagement with a disc 144 driven from motor 81 by a chain 145, and tending to rotate the collar to move it in a direction opposite to that in which it is driven by the rotation of the repeater motor 136. As the speed of the vessel increases, the motor 136 rotates screw 138 faster and moves the collar further along the screw and, hence, outwardly from the center of disc 144. The tendency of collar 139 to move in the reverse direction, i. e., inwardly, is thus increased as collar 139 moves outwardly on disc 144 until a point is reached where the speed of rotation of collar 139 due to its position on disc 144 is sufficient to move it inwardly at a rate which just counterbalances the tendency of the collar to move outwardly along the screw, due to the rotation of the latter. The collar remains in this position until the ship assumes a different speed, whereupon collar 139 will again be moved nearer or further from the center of disc 144 until it is being rotated by said disc at a speed sufficient to move it along the screw inwardly at the same rate that the rotating screw tends to move it outwardly. As collar 139 moves along the screw to various counter-balanced positions, corresponding to the various speeds of the ship, the yoke 141 will be swung to a corresponding degree, and by connecting one arm 146 having a geared sector 147 at its upper end to a pinion 148 upon whose shaft 149 (see Fig. 19) is fixed an indicating hand 150 (Fig. 1), a reading of the speed may be obtained by providing a suitably calibrated scale 151 with which hand 150 cooperates.

In order to secure a permanent record of the speed, there is provided a pulley 152 (Figs. 13 and 19) mounted on an axle 159 (Fig. 19) fixed to the rear wall 266 of the casing 135, and connected to shaft 149 by a clutch to be hereinafter more fully described, and over which pulley operates an endless cable 153 which extends into casing 10 over a pulley 154 (Fig. 2) at the far end of the chart and over a guide pulley 155 also within casing 10. Fixed to cable 153 is a carriage 160 mounted on rails 161 and 162 by rollers 163, and to which is attached the pen 130. It is obvious that the rotation of pulley 152 is dependent upon movements of collar 139 which is a direct function of the speed. Any changes in speed will therefore be transmitted to the pen to cause the latter to change its position correspondingly, and when the ship is traveling at constant speed there will be no lateral movement of the pen, a fact shown by a vertical line traced by the pen on the chart along the proper vertical line designating that particular speed. As clearly indicated in Figs. 3 and 4, the supporting arms for the pens 16 and 130 are so formed that one (here shown as the arm supporting pen 16) encircles the other, so that said pens may operate independently of each other.

It may be desirable to indicate not only the speed of the vessel but also the distance traveled on each trip and the total distance traveled by the ship on all of its trips. For this purpose there may be loosely mounted on shaft 138 (Fig. 13) a gear 155' driven by a gear 156 on shaft 157 driven by friction disks 180 and 137 from the repeater motor 136, said gear 155' having pawls 160' (Figs. 13 and 17) mounted thereon and adapted to engage a ratchet-disc 161' fixed to shaft 138 to drive said shaft when the ship is moving "ahead". By driving shaft 138 there is also driven sprocket wheel 162' which through chain 163' drives sprocket-wheel 164 to operate shaft 165 of the trip indicator 166 (Fig. 1). When the engines are reversed and the ship is traveling backward, however, pawls 160' will ride idly over ratchet or disc 161' so that shaft 138 does not rotate and hence the indicator 166 is not operated.

To record the total distance traveled by the ship on all of its trips, shaft 165 may be connected by any suitable driving mechanism, such as crank 167, link 168, and oscillatory crank 169 to the shaft 170 of a total mile indicator 171. Since the trip distance indicator cannot be driven backward by the backward movement of the ship, the total distance indicator also cannot be driven backward. To enable the trip distance indicator to be set to zero after each trip without turning back the total distance indicator, a suitable pawl and ratchet mechanism may be interposed between shaft 165 and the remaining mechanism of said trip distance indicator.

To compensate for the various variable factors which are dependent upon the structure of each particular ship, the rate at which shaft 138 is rotated from the repeater motor may be adjusted by operating a screw 175 (Fig. 13) to wind or unwind a cable or thread 176 fixed to one end of a lever 177, the other end of which is in the form of a yoke pivoted on a fixed bracket 178, the repeater motor being pivotally mounted in said yoke, so that raising or lowering of one end of lever 177 raises or lowers the motor to move the friction disc 180 inwardly or outwardly from the center of disc 137 with which it is in frictional contact to vary the speed of shaft 138. By this means, different ships traveling at the same speed may be made to record the same speeds, regardless of the factors dependent upon the individual ship. The amount of adjustment may be determined by the scale 182.

It is thus apparent that within casing 135 are positioned the driving mechanism for the recording charts and for the various indicating mechanisms, the speed-responsive means governing the movements of the speed-recording pen, the speed indicator, the trip distance indicator, and the total distance indicator. In addition there may be mounted in said casing, to be operated from said driving mechanism a clock and a shoal-water indicator.

The clock 185 may be driven from the shaft of ratchet wheel 87 (Fig. 13) by a cable 186 passing around idlers 187 and 188, over eccentric guides operated by nuts 189 and 190 to take slack in the chain, over a sprocket-wheel 191 from the shaft 192 of which is driven a train of gears of the usual clock type.

The shoal water indicator is disclosed more fully in applicant's copending application, Serial No. 394,528 filed July 7th, 1920, but may be briefly described as follows: In deep water, the number of revolutions per minute of the propeller shaft bears a constant ratio to the speed of the vessel, but as the ship enters shallow water this ratio changes rapidly. By connecting the speed indicator and a revolution-per-minute indicator with an integrating device, the above mentioned ratio may be indicated or the integrating device may operate an alarm. The R. P. M. indicator is a device similar to the speed-indicating device and comprises a repeater motor 200 operated from the propeller shaft, and driving by gears 201, 202, a screw-threaded shaft 203 upon which operates a collar 204 controlling the movements of a yoke 205 having a sector 206 at one end meshing with a pinion 207, to the shaft 208 of which is fixed an index 209 (Fig. 1) cooperating with an R. P. M. scale 210. The collar 204 is in frictional engagement with a disc 211 driven by the same chain 145 that drives pulley 152. The operation of this device is similar to that of the speed indicator, i. e., the greater the speed of rotation of motor 200, the further from the center of disc 211 the collar 204 will move, until the increased speed of the collar due to its outward movement on disc 211 counterbalances the speed of the motor and screw 203. Any movements of the collar 204 to counterbalanced positions will rotate shaft 208 to operate the indicator.

The shoal-water integrating device is therefore connected to shafts 149 and 208 which operate the indexes of the speed-indicator and R. P. M. indicator respectively (Fig. 15). To said shafts are fixed cams 215 and 216, respectively, said cams operating against one end of levers 217 and 218 pivoted at 219 and 220, respectively. Connected to lever 217 is a link 221 pivotally connected to one end of a lever 222. To the other end of lever 222 is pivoted a link 225 pivotally connected at its other end to a link 226 having a pin 227 engaging in a slot 228 in lever 218. Lever 222 is pivoted at 223 to one arm 224 of a bell-crank having a fixed pivot 225', the other 226 of said bell-crank having an electric contact 228' at its end cooperating with a fixed electric contact 229. It will be apparent that the cams 215 and 216 may be so positioned that when the ship is travelling in deep water, they occupy the same positions relative to levers 217 and 218, and hence, with respect to the ends of lever 222. Any increase in the speed of the engine, causing rotation of cam 216 to move links 218, 226, 225 and one end of lever 222 upwardly, is accompanied by a corresponding increase in the speed of the ship, causing rotation of cam 215 to move links 215, 217 and the other end of lever 222 downwardly to the same degree, and hence lever 222 merely rotates about its center 223 as a pivot. No force is thus applied to the bell-crank arm 224 and therefore, the bell-crank is not rotated about pivot 225'. But upon entering shallow water, the speed of the ship decreases, moving the corresponding end of lever 222 upwardly, but without a corresponding downward movement of the other end of lever 222, because the speed of the engine does not decrease, but rather increases due to the lightened load experienced in shallow water. The result is that lever 222 does not rotate about its center 223, and rotation takes place about pivot 225' to cause contact 228 to engage contact 229 and close the circuit to sound an alarm. The end of arm 226' carrying contact 228' may be used as an index in connection with a scale 235 (see Fig. 1) which will indicate the depth of water, sounding of the alarm being effected when the depth becomes dangerously low.

The initial position of links 225 and 226 may be adjusted for any particular ship by an adjusting screw 236 upon which operates a collar 237 having spaced projections 238 engaging link 226 on both sides thereof, so that operation of screw 236 will move the link to the right or left. Having set the shoal-water indicator for a given vessel by means of adjusting-screw 236, it will be found in time that the adhesion of barnacles and other foreign matter on the sides of the vessel will occasion such a loss in horse-power of the vessel that the alarm will sound prematurely. This can be avoided by varying the distance between contacts 228' and 229 correspondingly. The adjustment may be accomplished by mounting contact 229 upon a member 240 slidable in a guide slot 241 and operable by means of a forked member 242 engaging said member 240, said forked member being operable upon a screw 243.

The apparatus heretofore described as located in casing 135 may be further utilized for still another indication, i. e., the direction of movement of the vessel. For this purpose gear 202, (Fig. 13) driven from repeater motor 200, has frictional engagement through friction strips (preferably of leather) 245 with a plate 246 loosely mounted upon the same shaft to which gear 202 is fixed, so that movement of 202 in one direction or the other, depending upon the direction of rotation of motor 200 and hence of the engines, will drag plate 246 with it until an arm 247 contacts with a bent-off portion 248 of a shaft 249 carrying a signal 250 (see Fig. 14). Movement of plate 246 in one direction causes the signal to be rotated upwardly, while movement of plate 246 in the opposite direction will rotate the signal downwardly to show that the engines have been reversed, suitable designation 251 (Fig. 1) being carried by the signal.

By referring to Fig. 14 it will be observed that the entire mechanism contained within casing 135, with the exception of shaft 65 and its bearings, pulley 152, ratchet-wheel 80 and pawl 79, is mounted upon an instrument board B, and that said board is hingedly mounted upon the casing at 260, 261 (Fig. 1) so that it may be swung out of the casing to allow access to the mechanism carried thereby. When in position within the casing the board may be locked against movement by a latch 265. To enable shaft 149 to be disconnected from pulley 152 (the latter remaining on the rear wall because the cable 153 passing thereover extends into casing 10 and would otherwise have to be disconnected) a clutch is interposed, said clutch comprising a member 267 (Figs. 19 and 20) having a leaf-spring 268 fixed thereto, and a pin 269 fixed to said spring and extending through member 267, said pin engaging in a slot 270 in a cooperating clutch member 271 movable integrally with pulley 152. When board B is swung outwardly, the clutch is disconnected, and when the board is swung inwardly the pin 269 will engage in slot 270 to render the clutch effective. If the ship has changed its speed while the instrument board B is swung outwardly, pin 269 will not engage in slot 270 but will strike the face of member 271 and be pressed outwardly against the action of spring 269 until the ship again travels at the same speed as when the board was swung outwardly, at which time the pin 269 will drop into slot 270. The elongated slot 270 will take care of vertical variations.

It will thus be apparent that the instruments contained within casings 10 and 135 form an indicating unit which, by means of record charts, registering instruments and indicators, show the essential facts necessary for controlling the vessel.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having herein described my invention what I claim and desire to secure by Letters Patent is, 1. In an instrument for recording circular motion, the combination with a compass, of a continuously traveling chart, a recording pen cooperating therewith, and means connecting said compass and pen adapted to move the pen across the chart more than two times for one complete rotation of the compass.

2. In a course recorder for vessels, the combination with a compass, of a continuously traveling chart, the width of said chart representing a quarter of the azimuth scale, a recording pen cooperating therewith and controlled by said compass and means also connected to the compass for indicating on the chart which quarter of the azimuth scale the compass is in.

3. In an instrument for recording circular motion, the combination with a compass, of a chart, said chart being subdivided longitudinally into subdivisions representing degrees, a recording and a zone pen cooperating with said chart and controlled by said compass, the width of said chart representing a fraction of the azimuth scale, means whereby the turning of the compass through 360° operates said recording pen back and forth a plurality of times equal to the number of said fractions in the azimuth scale, a plurality of zones on the chart corresponding in number to said fraction number, and means for moving said zone pen from one zone to another when said recording pen reaches the limit of its movement in either direction.

4. In a course recorder, the combination with a compass, of a chart, said chart being subdivided longitudinally into subdivisions representing degrees, a recording pen cooperating with said chart and controlled by said compass, the width of said chart representing a fraction of the azimuth scale, means whereby the relative turning of the compass through 360° operates said pen back and forth a plurality of times equal to the number of said fractions in the azimuth scale, and means for indicating in which portion of the azimuth scale the compass is operating.

5. In a course recorder, the combination with a compass, of a chart, said chart being subdivided longitudinally into subdivisions representing degrees, a recording pen cooperating with said chart and controlled by said compass, the width of said chart representing a fraction of the azimuth scale, means whereby the turning of the compass through 360° operates said pen back and forth a plurality of times equal to the number of said fractions in the azimuth scale, said chart being provided with rows of indicia, each row corresponding to one of said fractions, and means for indicating in which portion of the azimuth scale the compass is operating and which of said rows of indicia on the chart is to be read.

6. In a course recorder, the combination with a compass, of a chart, said chart being subdivided longitudinally into subdivisions representing degrees, a recording pen cooperating with said chart and controlled by said compass, the width of said chart representing one quadrant of the azimuth scale, means whereby the turning of the compass through 360° operates said pen four times across said chart and means for indicating in which quadrant the compass is operating.

7. In a course recorder, the combination with a compass, of a chart, said chart being subdivided longitudinally into subdivisions representing degrees, a recording pen cooperating with said chart and controlled by said compass, the width of said chart representing one quadrant of the azimuth scale, means whereby the turning of the compass through 360° operates said pen a plurality of times across said chart, said chart being provided with a like number of rows of indicia corresponding to the sectors of the azimuth scale, and means for indicating in which sector the compass is operating.

8. In a course recorder, the combination with a compass, of a chart, said chart being subdivided longitudinally into subdivisions representing degrees, a recording pen cooperating with said chart and controlled by said compass, the width of said chart representing one quadrant of the azimuth scale, means whereby the turning of the compass through 360° operates said pen back and forth across said chart in two complete cycles, said chart being provided with four rows of indicia arranged in two complete back and forth cycles and corresponding to the four quadrants of the azimuth scale, and means for indicating in which quadrant the compass is operating.

9. In a course recorder, the combination with a compass, of a chart, said chart being subdivided longitudinally into subdivisions representing degrees, a recording pen cooperating with said chart and controlled by said compass, the width of said chart representing a fraction of the azimuth scale, means whereby the turning of the compass through 360° operates said pen back and forth a plurality of times equal to the number of said fractions in the azimuth scale, said chart being provided with rows of indicia, each row corresponding to one of said fractions, and means for indicating in which portion of the azimuth scale the compass is operating and which of said rows of indicia on the chart is to be read, said last-named means comprising marking means, said chart having a plurality of longitudinal subdivisions corresponding to the number of fractions in the azimuth scale, and means whereby said marking means is governed by said compass to cause said marking means to operate in the subdivision corresponding to the portion of the azimuth scale in which said compass is operating.

10. In a recording instrument, a recording chart, means for moving said chart longitudinally, a roller whose rotation is controlled by the movements of a compass, a pen cooperating with said chart and mounted for movement laterally thereof, said roller having a cam slot, said pen having a portion engaging in said slot so that rotation of the roller due to movements of the compass will cause lateral movement of said pen, said cam extending back and forth across the roller for a plurality of complete cycles in one turn of the roller so that said pen, in one complete turn of the compass, will be carried back and forth across the chart for a similar number of complete cycles, so that movement of said pen across the chart represents movement of the compass through a corresponding fraction of the azimuth scale.

11. In a recording instrument, a recording chart, means for moving said chart longitudinally, a roller whose rotation is controlled by the movements of a compass, a pen cooperating with said chart and mounted for movement laterally thereof, said roller having a cam slot, said pen having a portion engaging in said slot, so that rotation of the roller due to movements of the compass will cause lateral movement of said pen, said cam extending back and forth across the roller for two complete cycles in one turn of the roller so that said pen in one complete turn of the compass will be carried back and forth across the chart for two complete cycles so that movement of said pen across the chart represents movement of the compass through ninety degrees.

12. In a recording instrument, a recording chart, means for moving said chart longitudinally, a cylindrical roller whose rotation is controlled by the movements of a compass, a pen cooperating with said chart and mounted for movement laterally thereof, said roller having a cam slot in its cylindrical surface, said pen having a portion engaging in said slot so that rotation of the roller due to movements of the compass will cause lateral and rectilinear movement of said pen and an indicator operatively connected to said roller for registering the position of the compass in the azimuth scale.

13. In a course recorder, the combination with a compass of a chart, said chart being subdivided longitudinally into subdivisions representing degrees, a recording pen cooperating with said chart and controlled by said compass, the width of said chart representing a fraction of the azimuth scale, means whereby the turning of the compass through 360° operates said pen back and forth a plurality of times equal to the number of said fractions in the azimuth scale, and means for indicating in which portion of the azimuth scale the compass is operating, said last named means comprising a marker, said chart having a plurality of longitudinal subdivisions corresponding to the number of said fractions in the azimuth scale, and a cam member controlled by said compass, said cam member engaging said marker, the movement of said cam member serving to move said marker into the proper subdivision corresponding to the portion of the azimuth scale in which said compass is operating.

14. In a course recorder, the combination with a compass of a chart, said chart being subdivided longitudinally into subdivisions representing degrees, a recording pen cooperating with said chart and controlled by said compass, the width of said chart representing one quadrant of the azimuth scale, means whereby the turning of the compass through 360° operates said pen four times across said chart, said chart being provided with four rows of indicia corresponding to the four quadrants of the azimuth scale, and means for indicating in which quadrant the compass is operating, said last named means comprising a marker, said chart having four longitudinal subdivisions corresponding to the quadrants of the azimuth scale, a cam member controlled by said compass, said cam member engaging said marker, the movement of said cam member serving to move said marker into the proper subdivision corresponding to the portion of the azimuth scale in which said compass is operating.

15. In a recording instrument, a recording chart, means for moving said chart longitudinally, a roller whose rotation is controlled by the movements of a compass, a pen cooperating with said chart and mounted for movement laterally thereof, said roller having a cam slot, said pen having a portion engaging in said slot so that rotation of the roller due to movements of the compass will cause lateral movement of said pen, and a lost-motion connection interposed between said compass and said roller to take up slight vibratory movements of the compass.

16. In a course recorder, the combination with a compass of a chart, said chart being subdivided longitudinally into subdivisions representing degrees, a recording pen cooperating with said chart and controlled by said compass, the width of said chart representing one quadrant of the azimuth scale, means whereby the turning of the compass through 360° operates said pen four times across said chart, said chart being provided with four rows of indicia corresponding to the four quadrants of the azimuth scale and means for indicating in which quadrant the compass is operating, said last-named means comprising marking means, said chart having four longitudinal subdivisions corresponding to the quadrants of the azimuth scale and means whereby said marking means is governed by said compass to cause said marking means to operate in the subdivision corresponding to the quadrant in which the compass is operating.

17. In a recording instrument, the combination with a gyroscopic compass subject to continuous small-amplitude oscillations, of transmitting means for transmitting the readings of the compass to a distance, a recording instrument, including a repeater motor actuated by said transmitting means for actuating said instrument, and a lost motion device between said motor and said instrument for preventing said small-amplitude oscillations from being recorded.

18. In a recorder for continuously recording circular motion, a chart divided into separate regions, one of said regions indicating sectors of a circle, and the other indicating divisions of such sectors.

19. In a recorder for continuously recording circular motion, a chart having a large and a small longitudinal region, one of said regions recording sectors of a circle, and the other recording subdivisions of such sectors.

20. As a means for obtaining an open-scale, continuous record of circular motion within the confines of a comparatively narrow chart, said chart having a plurality of groups of markings thereon, one group of said markings indicating sectors of a circle, and the other group of said markings indicating divisions of any one of such sectors whereby the breadth of the chart is only slightly greater than the width of the indicating divisions of one sector.

21. In a ship's course recorder, the combination with a chart divided into separate regions, one of said regions indicating sectors of a circle and the other indicating divisions of any one of such sectors, an indicator showing the heading of the ship, a pen for marking the proper sector in the first mentioned region, and a cam carried by said indicator for positioning said pen.

22. In a ship's course recorder, the combination with a chart divided into separate regions, one of said regions indicating sectors of a circle and the other indicating divisions of any one of such sectors, a pen for marking each region, a cam for moving the pen for the first named region having the same number of position surfaces as the chart has sectors, and a second cam for moving the other pen.

23. In an instrument for recording circular motion, the combination with a compass, of a continuously traveling chart, a recording pen cooperating therewith, means connecting said compass and pen adapted to move the pen across the chart a plurality of times for one complete rotation of the compass, and means other than said pen for indicating which sector of the circle of motion the vehicle is in.

24. Apparatus for recording the orientation of a body comprising a recorder movable relatively to a record sheet for recording the quadrant in which the body is oriented, a recorder movable relatively to the same record sheet for recording the position of the body within each quadrant, and means responsive to angular movement of said body for controlling said recorders.

25. A direction recorder including two indicating means, one of said indicating means being movable to indicate deviation in direction relative to a predetermined direction and the other indicating a change in direction from one side of a predetermined line to the other, a rotary cam with concentric dwells controlling the last named indicating means.

26. A direction recorder, including two markers, one of said markers being movable to indicate the deviation in direction relative to a predetermined directional line, the other marker being movable from one position to indicate a direction at one side of another predetermined directional line to a second position to indicate a direction at the other side of the predetermined line.

27. A direction recorder comprising a controller having full circular movement in either direction in response to changes in direction, two indicators oscillating parallel to the same recording surface each of which oscillates in response to circular movement of said controller in either direction and connections between the controller and the indicators to move one indicator in response to any movement of the controller and to move the other indicator only when the first indicator is near an end of its oscillatory range.

28. A direction recorder comprising a controller having full circular movement in either direction in response to changes in direction, two indicators oscillating parallel to the same recording surface each of which oscillates in response to circular movement of said controller in either direction, one indicator having a wide range of oscillation and the other indicator having a limited range, and connections between the controller and the indicators to move the first indicator in response to any movement of the controller and to move the second indicator only when the first indicator is near an end of its range of oscillation.

29. A direction recorder comprising a controller having full circular movement in either direction in response to changes in direction, two indicators oscillating parallel to the same recording surface each of which oscillates in response to circular movement of said controller in either direction, one indicator having a limited range of oscillation to either side of the central position of the other indicator, and connections between the controller and the indicators to move the first indicator from one side to the other side of said central position at the instant the second indicator reverses its movement.

30. A direction recorder comprising oscillatory indicators, and means including rotary cams having endess surfaces for moving said indicators back and forth when rotated continuously in either direction, the cams being correlated to move one indicator across its central position while the other indicator is reversed at the end of its oscillation.

31. A direction recorder comprising one indicator which is movable to and fro, a rotary cam having an endless surface for moving said indicator in accordance with changes in direction and means connecting the cam and indicator to move the indicator back and forth through a complete cycle during each revolution of the cam, and another indicator movable from one position to another position when the direction is changed from one side of a predetermined directional line to the other side thereof.

32. A direction recorder comprising one indicator which is movable to and fro, a rotary cam having an endless surface for moving said indicator in accordance with changes in direction and means connecting the cam and indicator to move the indicator back and forth through a complete cycle during each revolution of the cam, and another indicator movable from one position to another position when the direction is changed from one side of a predetermined directional line to the other side thereof, said last named indicator being actuated by a cam having concentric dwells.

33. Apparatus for recording the course of a moving body on a record sheet comprising a recorder movable parallel to the record sheet for recording the sector in which the body is orientated, a recorder movable relatively to the record sheet for recording the angular position of the body within each sector, and means responsive to angular movement of said body for controlling said recorders.

In testimony whereof I have affixed my signature.

ELMER A. SPERRY.